US011146698B2

(12) United States Patent
Takeuchi et al.

(10) Patent No.: US 11,146,698 B2
(45) Date of Patent: Oct. 12, 2021

(54) TERMINAL DEVICE, NON-TRANSITORY COMPUTER-READABLE STORAGE MEDIUM STORING DISPLAY CONTROL PROGRAM, AND DISPLAY CONTROL METHOD

(71) Applicant: SEIKO EPSON CORPORATION, Tokyo (JP)

(72) Inventors: Takeshi Takeuchi, Matsumoto (JP); Hiroyuki Kuramoto, Shiojiri (JP); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/935,872

(22) Filed: Jul. 22, 2020

(65) Prior Publication Data
US 2021/0029259 A1    Jan. 28, 2021

(30) Foreign Application Priority Data
Jul. 24, 2019 (JP) .............................. JP2019-135897

(51) Int. Cl.
*H04N 1/00* (2006.01)
*G06F 1/16* (2006.01)
*G06F 3/12* (2006.01)

(52) U.S. Cl.
CPC ....... *H04N 1/00456* (2013.01); *G06F 1/1618* (2013.01); *G06F 1/1641* (2013.01); *G06F 3/1208* (2013.01); *G06F 3/1243* (2013.01); *G06F 3/1256* (2013.01)

(58) Field of Classification Search
CPC . H04N 1/00456; G06F 1/1618; G06F 1/1641; G06F 3/1208; G06F 3/1243; G06F 3/1256; G06F 1/1652
See application file for complete search history.

(56) References Cited

U.S. PATENT DOCUMENTS

| 2005/0206953 | A1  | 9/2005  | Kujirai et al. |
| 2012/0081306 | A1* | 4/2012  | Sirpal ................ G06F 3/0412 345/173 |
| 2013/0076597 | A1* | 3/2013  | Becze ................ G06F 3/0481 345/1.3 |
| 2015/0022436 | A1* | 1/2015  | Cho .................... G06F 3/147 345/156 |
| 2017/0345396 | A1* | 11/2017 | Yu ..................... G06F 1/1652 |

FOREIGN PATENT DOCUMENTS

| JP | 2011-044152 | 3/2011 |
| JP | 2017-188027 | 10/2017 |
| JP | 2018-072662 | 5/2018 |

\* cited by examiner

*Primary Examiner* — Iriana Cruz
(74) *Attorney, Agent, or Firm* — Workman Nydegger (57) ABSTRACT

A terminal device includes: a display unit configured to take a plurality of forms including a folded form in which the display unit is bent between a first display region and a second display region and an extended form in which the display unit is not bent between the first display region and the second display region; and a display control unit that controls display performed by the display unit. The display control unit causes a first image corresponding to an obverse side to be displayed in the first display region and causes a second image corresponding to a reverse side to be displayed in the second display region, when the display unit is in the folded form.

10 Claims, 11 Drawing Sheets

TERMINAL DEVICE, NON-TRANSITORY COMPUTER-READABLE STORAGE MEDIUM STORING DISPLAY CONTROL PROGRAM, AND DISPLAY CONTROL METHOD

The present application is based on, and claims priority from JP Application Serial Number 2019-135897, filed Jul. 24, 2019, the disclosure of which is hereby incorporated by reference herein in its entirety.

BACKGROUND

1. Technical Field

The present disclosure relates to a terminal device, a non-transitory computer-readable storage medium storing a display control program, and a display control method.

2. Related Art

Flexible displays that are foldable have been disclosed (see JP-A-2018-72663 and JP-A-2017-188027). Also, an information processing device has been disclosed that displays a preview image in which an image of a first page and an inverted image of a second page are superimposed on one another, based on two-sided printing set by setting unit (see JP-A-2011-44152).

It is difficult for a user to check, with one display screen, two images that are in a relationship of obverse-and-reverse sides, like two images that are two-sided printed. For example, when a preview image in which an image of a first page and an inverted image of a second page are superimposed on one another is displayed, as in JP-A-2011-44152, it is difficult to view a portion where both the images overlap each other, and thus it is difficult to say that the technique is user-friendly and that a user easily recognizes images of obverse and reverse sides.

SUMMARY

According to an aspect of the present disclosure, a terminal device includes: a display unit configured to take a plurality of forms including a folded form in which the display unit is bent between a first display region and a second display region and an extended form in which the display unit is not bent between the first display region and the second display region; and a display control unit that controls display performed by the display unit. The display control unit causes a first image corresponding to an obverse side to be displayed in the first display region and causes a second image corresponding to a reverse side to be displayed in the second display region, when the display unit is in the folded form.

DESCRIPTION OF EXEMPLARY EMBODIMENTS

An embodiment of the present disclosure will be described below with reference to the accompanying drawings. The drawings are merely illustrative for describing the present embodiment. Since the drawings are illustrative, the scale ratios may be inaccurate and may be different from one another, and one or some portions may be omitted.

1. Device Configuration

Figure 1:
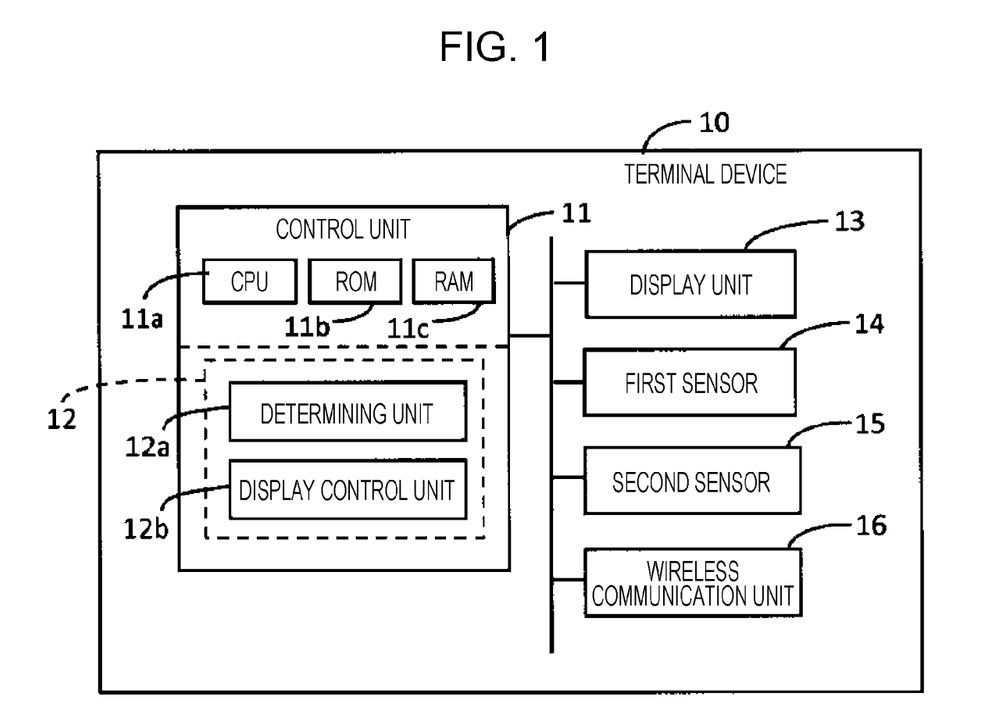
FIG. 1 is a block diagram schematically illustrating a device configuration.

FIG. 1 schematically illustrates the configuration of a terminal device 10 according to the present embodiment. The terminal device 10 is a smartphone or a tablet terminal. The terminal device 10 includes a control unit 11, a display unit 13, a first sensor 14, a second sensor 15, and a wireless communication unit 16. The control unit 11 includes one or more integrated circuits (ICs) having a central processing unit (CPU) 11a, which is a processor, a read-only memory (ROM) 11b, a random-access memory (RAM) 11c, and so on.

In the control unit 11, the processor, that is, the CPU 11a, executes computational processing according to various programs, stored in the ROM 11b or another memory, by using the RAM 11c as a work area to thereby control the terminal device 10. The control unit 11 functions as a determining unit 12a or a display control unit 12b by executing a display control program 12, which is one of the programs.

The display unit 13 is a display including a first display region 13a and a second display region 13b. According to FIGS. 2 to 5, which are described below, the display unit 13 is a flexible display in which a region between the first display region 13a and the second display region 13b is bent. The display unit 13 also functions as a touch panel that receives an operation performed by a user. The terminal device 10 having the display unit 13 may also be called a display device.

The first sensor 14 is constituted by one or more sensors for sensing the orientation and the rotation of the terminal device 10. Specifically, the first sensor 14 is an acceleration sensor or a gyro-sensor. The second sensor 15 is constituted by one or more sensors for sensing the form of the terminal device 10. The terminal device 10 takes a plurality of forms including a "folded form" in which the display unit 13 is bent between the first display region 13a and the second display region 13b and an "extended form" in which the display unit 13 is not bent between the first display region 13a and the second display region 13b. In the folded form, both the first display region 13a and the second display region 13b face outward. The forms of the terminal device 10, such as the folded form and the extended form, may also be the forms of the display unit 13 at the same time.

The wireless communication unit 16 is a unit used for executing wireless communication with an external device by using a public communication channel, a wireless local area network (LAN), or the like. The wireless communication unit 16 communicates with, for example, a printer, which is not illustrated. Needless to say, the constituent elements illustrated in FIG. 1 are merely some of the constituent elements of the terminal device 10. The terminal device 10 has various constituent elements that are generally included in a smartphone or a tablet terminal. Examples of the constituent elements include a speaker, a microphone, a camera, a terminal for cable connection, and physical buttons.

Figure 2:
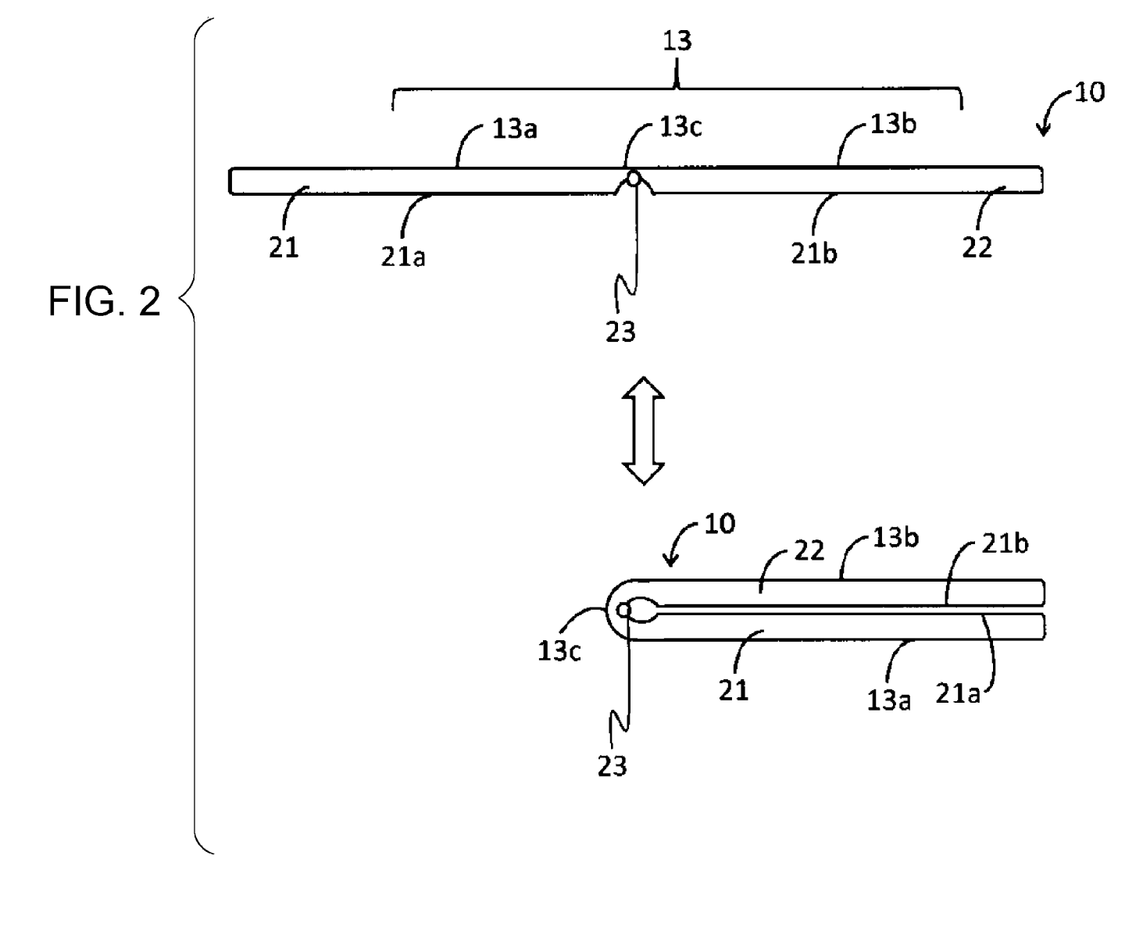
FIG. 2 is a view illustrating a state in which the form of a terminal device having a symmetric shape changes.

FIG. 2 illustrates a state in which the form of the terminal device 10 changes. The terminal device 10 in the extended form is illustrated at the upper side in FIG. 2, and the terminal device 10 in the folded is illustrated at the lower side in FIG. 2. A housing of the terminal device 10 is generally constituted by a first housing 21 and a second housing 22. The first housing 21 and the second housing 22 each have a plate shape. These housings 21 and 22 accommodate or include the constituent elements of the terminal device 10 illustrated in FIG. 1. The first housing 21 and the second housing 22 are coupled to each other to be rotatable about a hinge 23. By rotating the first housing 21 and/or the second housing 22 about the hinge 23, the user switches the form of the terminal device 10 to the extended form or the folded form. The first housing 21 and the second housing 22 may be coupled to the hinge 23 by using members having flexibility and elasticity, to thereby easily realize the folded form, as illustrated at the lower side in FIG. 2.

The display unit 13, which is a single continuous flexible display, is disposed at a surface of the plate-shaped housing constituted by the first housing 21 and the second housing 22. Of the display unit 13, a region disposed on the first housing 21 is the first display region 13*a*, and a region disposed on the second housing 22 is the second display region 13*b*. Of the display unit 13, a region that corresponds to the position of the hinge 23 and that couples the first display region 13*a* and the second display region 13*b* is a bending region 13*c*. More specifically, of the display unit 13, which is a flexible display, a range that is bent when the display unit 13 is in the folded form corresponds to the bending region 13*c*.

As illustrated at the upper side in FIG. 2, when the terminal device 10 is in the extended form, the first display region 13*a* and the second display region 13*b* face in the same direction. The state in which "the first display region 13*a* and the second display region 13*b* face in the same direction" is not limited to a state in which the orientations thereof are strictly the same. For example, a state in which the user can recognize that the first display region 13*a* and the second display region 13*b* face in the same direction even though the direction in which the first display region 13*a* faces and the direction in which the second display region 13*b* faces are slightly different from each other is also construed to be included in the state in which the first display region 13*a* and the second display region 13*b* face in the same direction.

As illustrated at the lower side in FIG. 2, when the terminal device 10 is in the folded form, the first display region 13*a* and the second display region 13*b* face in opposite directions. In the folded form, a first reverse surface 21*a*, which is a surface opposite to the surface of the first housing 21 at which the display unit 13 is disposed, and a second reverse surface 21*b*, which is a surface opposite to the surface of the second housing 22 at which the display unit 13 is disposed, face each other. The state in which the first display region 13*a* and the second display region 13*b* face in opposite directions is not limited to a state in which they face in directions that are strictly opposite to each other.

For example, a state in which the user can recognize that the first display region 13*a* and the second display region 13*b* face in opposite directions even though the angle made by the direction in which the first display region 13*a* faces and the direction in which the second display region 13*b* faces slightly differ from 180° is also construed to be included in the state in which the first display region 13*a* and the second display region 13*b* face in opposite directions.

Figure 3:
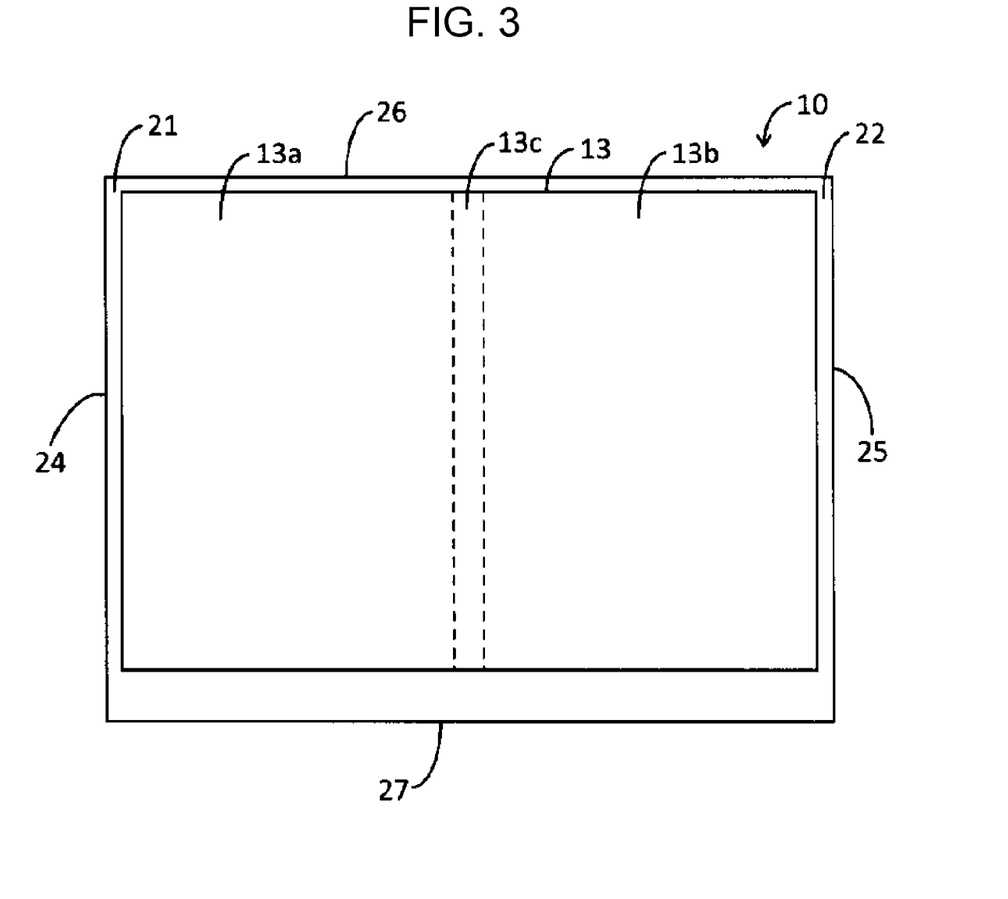
FIG. 3 is view illustrating a terminal device having a symmetric shape, viewed from a viewpoint that opposes a display unit in an extended form.

FIG. 3 illustrates the terminal device 10 in the extended form, viewed from a viewpoint that opposes the display unit 13. Although the inside of the display unit 13, which is a flexible display, in FIG. 3 is divided by dashed lines to depict the first display region 13*a*, the bending region 13*c*, and the second display region 13*b*, such dashed lines are naturally not provided in practice. Of end portions of four sides of the plate-shaped housing of the terminal device 10, one end portion that is parallel to the longitudinal direction of the bending region 13*c* is referred to as a "first end portion 24", and another end portion that is parallel to the longitudinal direction of the bending region 13*c* is referred to as a "second end portion 25". In addition, of the end portions of the four sides of the housings, one end portion that couples the first end portion 24 and the second end portion 25 is referred to as a "third end portion 26", and another end portion that couples the first end portion 24 and the second end portion 25 is referred to as a "fourth end portion 27".

In the example in FIGS. 2 and 3, the first housing 21 and the first display region 13*a* have the same or substantially the same size as the second housing 22 and the second display region 13*b*, and the terminal device 10 generally has a symmetric shape with respect to the hinge 23. However, the terminal device 10 may have an asymmetric shape with respect to the hinge 23 and the bending region 13*c*.

Figure 4:
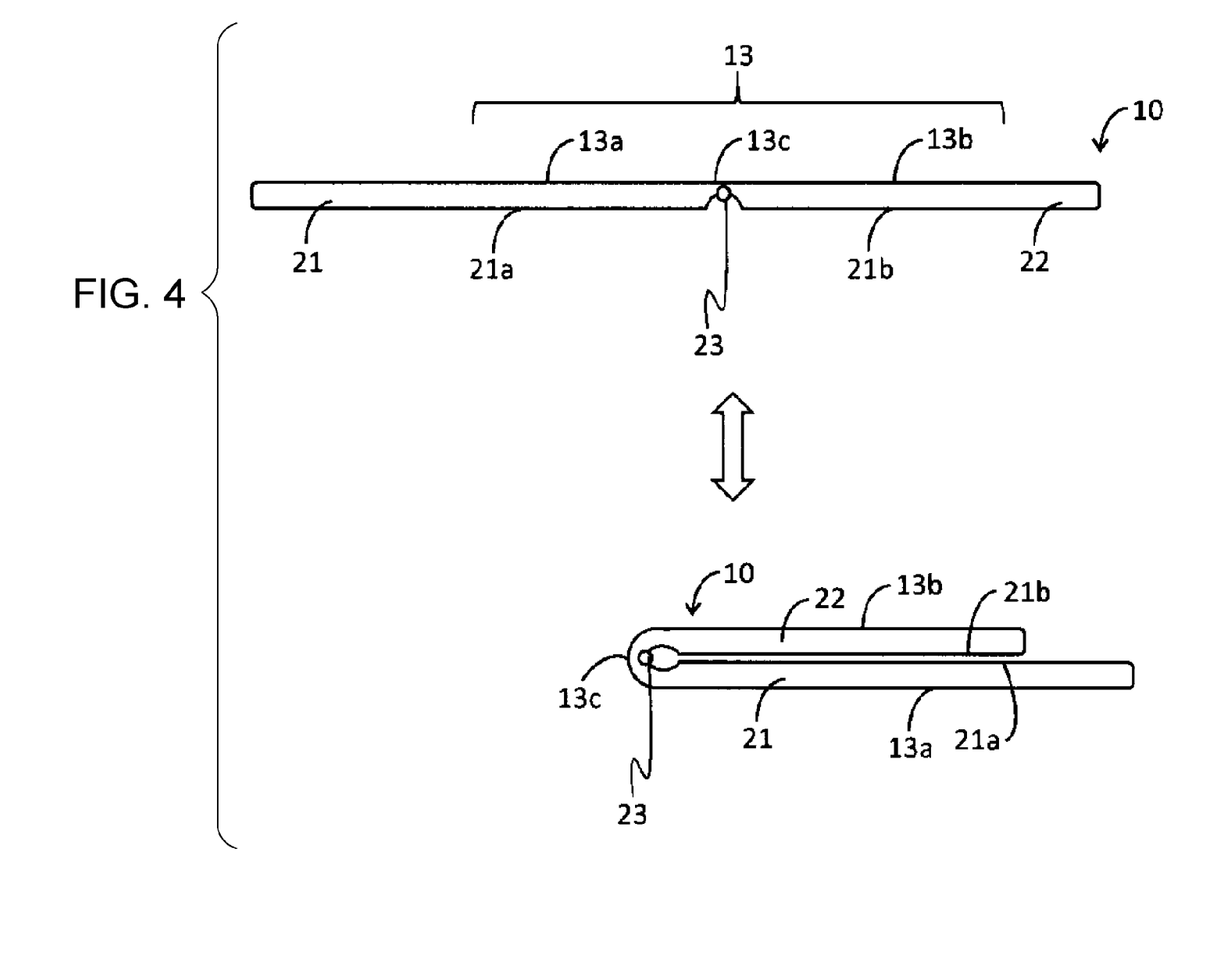
FIG. 4 is a view illustrating a state in which the form of a terminal device having an asymmetric shape changes.
Figure 5:
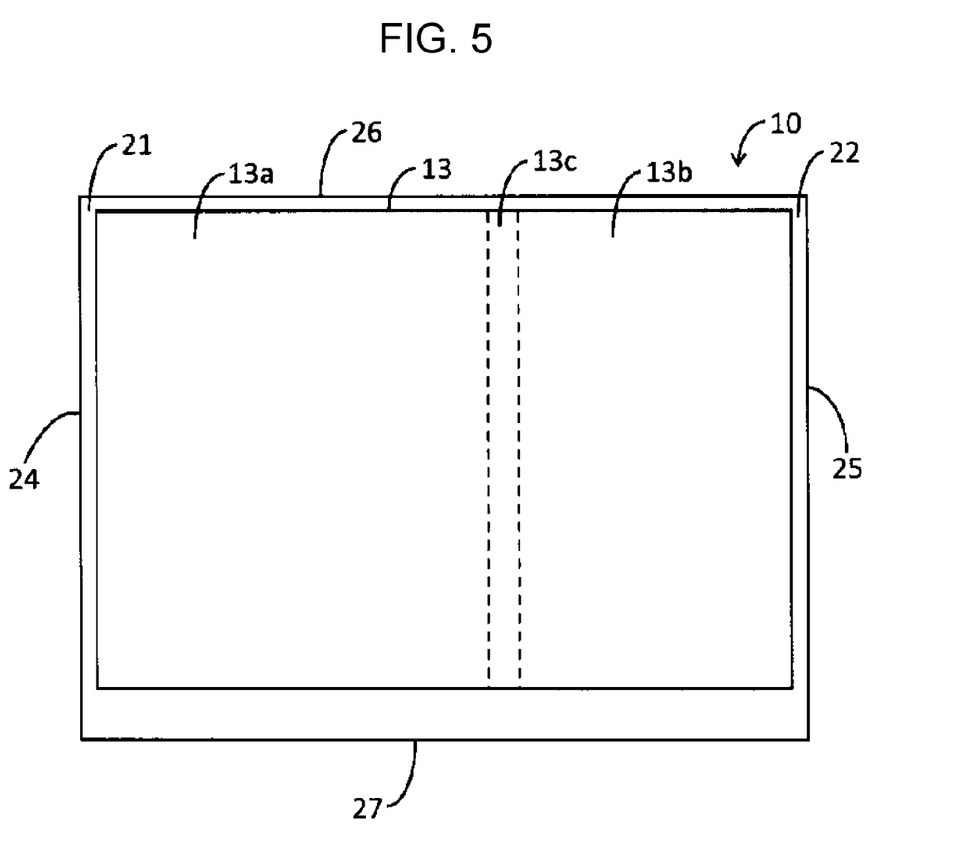
FIG. 5 is a view illustrating a terminal device having an asymmetric shape, viewed from a viewpoint that opposes the display unit in the extended form.

FIG. 4 illustrates a state in which the form of the terminal device 10 having an asymmetric shape changes, viewed from the same perspective as that in FIG. 2. FIG. 5 illustrates a state in which the terminal device 10 having the asymmetric shape illustrated in FIG. 4 is in the extended form, viewed from the same perspective as that in FIG. 3. According to the example in FIGS. 4 and 5, the first housing 21 is larger than the second housing 22, and the first display region 13*a* disposed on the first housing 21 of the display unit 13 has a larger area than the second display region 13*b* disposed on the second housing 22.

The display unit 13 may be constituted by two displays that are separately disposed in the first housing 21 and the second housing 22, rather than being a single flexible display that is disposed across the first housing 21 and the second housing 22. When these two displays are collectively referred to as the display unit 13, the display disposed in the first housing 21 corresponds to the first display region 13*a*, and the display disposed in the second housing 22 corresponds to the second display region 13*b*. Also, when the first display region 13*a* and the second display region 13*b* are two separate displays, as described above, the bending region 13*c*, which is a portion of the display unit 13, is not provided.

2. Display Control Processing

Figure 6:
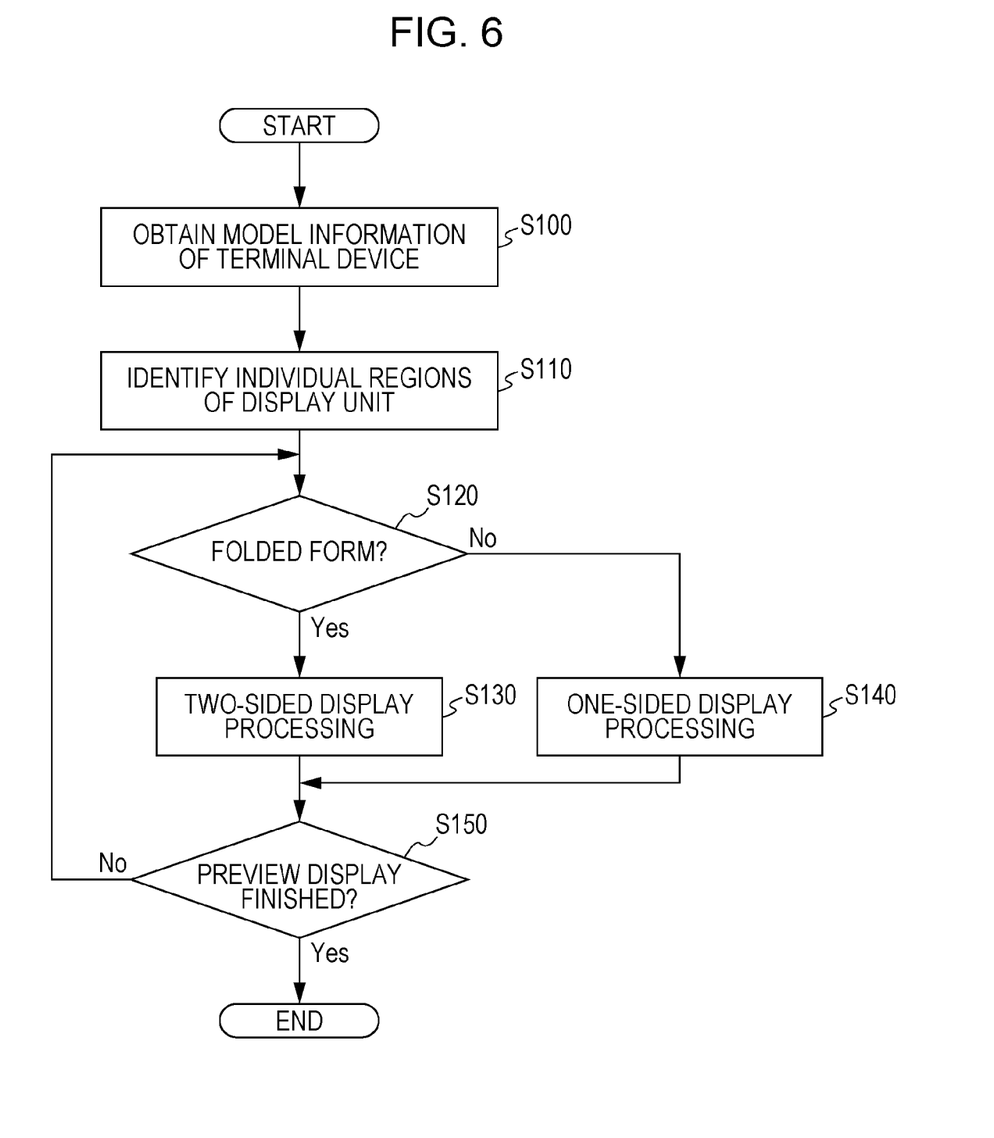
FIG. 6 is a flowchart illustrating display control processing.

FIG. 6 is a flowchart illustrating display control processing that the control unit 11 executes according to the display control program 12. The display control processing will now be described in conjunction with an example of a scene in which preview display is performed on the display unit 13 before a printer, not illustrated, executes two-sided printing of an image file having images of respective pages. The "two-sided printing" as used herein refers to processing for printing a "first image" on a first side of a print medium and printing a "second image" on a second side corresponding to the reverse side of the first side of the print medium. The "first side and the second side of the print medium" refer to one side and the other side of two sides of the print medium. The images of the respective pages are also referred to as page images. The images represent various types of content, such as documents, pictures, and computer graphics (CG). When a user's operation for a start instruction for starting preview display about one image file is received, the control unit 11 starts the processing in the flowchart in FIG. 6.

In step S100, the display control unit 12b obtains model information of the terminal device 10. The model information of the terminal device 10 is stored, for example, in the ROM 11b. The model information is information stating product specifications, a version number, and so on of the terminal device 10 and also includes specification information of the display unit 13. The specification information of the display unit 13 includes information indicating display regions of the display unit 13, for example, information indicating the first display region 13a and the second display region 13b of the flexible display. The display unit 13 will be described below as being a flexible display, unless otherwise particularly specified.

In step S110, the display control unit 12b identifies individual regions of the display unit 13, based on the model information obtained in step S100. The individual regions are, namely, the first display region 13a, the bending region 13c, and the second display region 13b. The model information includes information about the size of the first housing 21, the size of the second housing 22, the size of the display unit 13, the position of the hinge 23, and so on. The model information may also include information directly indicating the position and the size of the bending region 13c of the display unit 13.

Based on such model information, the display control unit 12b identifies the respective ranges of the first display region 13a, the bending region 13c, and the second display region 13b on the display unit 13. For example, based on coordinates in the longitudinal direction of the display unit 13 in the extended form, one point of the four corners of the display unit 13 being a reference point of the coordinates, the display control unit 12b identifies the first display region 13a, the bending region 13c, and the second display region 13b on the display unit 13. The term "longitudinal direction" as used herein refers to a direction that is parallel to the third end portion 26 and the fourth end portion 27 of the terminal device 10.

In step S120, the determining unit 12a determines whether or not the display unit 13 is in the folded form, in accordance with a sense signal output from the second sensor 15. Upon determining that the display unit 13 is in the folded form ("Yes" in step S120), the determining unit 12a advances the process to step S130. On the other hand, upon determining that the display unit 13 is not in the folded form, that is, is in the extended form ("No" in step S120), the determining unit 12a advances the process to step S140.

The second sensor 15 may be any sensor that outputs a sense signal used for determining in which of the extended form and the folded form the display unit 13 is. For example, the second sensor 15 is provided at one of the first reverse surface 21a and the second reverse surface 21b. The second sensor 15 may be configured to output a signal indicating that the first reverse surface 21a and the second reverse surface 21b are the closest to each other, that is, a sense signal indicating that the display unit 13 in the folded form, to the control unit 11, when the first reverse surface 21a and the second reverse surface 21b oppose each other, as illustrated at the lower side in FIG. 2 and the lower side in FIG. 4.

In another example, the second sensor 15 may be configured to output, to the control unit 11, a sense signal indicating an angle made by the first housing 21 and the second housing 22 which are bordered by the hinge 23. In another example, the terminal device 10 may be provided with a lock mechanism for physically locking the form of the terminal device 10 that is folded. The lock mechanism is operated by the user. The second sensor 15 may be configured to output a sense signal indicating that the terminal device 10 is in the folded form to the control unit 11, when the lock mechanism is in a locked state in which the form of the terminal device 10 is locked.

In step S130, the display control unit 12b executes "two-sided display processing". In step S140, the display control unit 12b executes "one-sided display processing". When the display is performed in step S130 or step S140, the display control unit 12b determines whether or not the user's operation for a finish instruction for finishing the preview display is received (step S150). Upon receiving the finish instruction ("Yes" in step S150), the display control unit 12b closes the preview display and ends the processing in the flowchart in FIG. 6. On the other hand, when the display control unit 12b does not receive the finish instruction ("No" in step S150), the display control unit 12b returns to the determination in step S120.

The two-sided display processing is processing in which the display control unit 12b causes a "first image" to be displayed in the first display region 13a and causes a "second image" to be displayed in the second display region 13b. Both the first image and the second image are page images included in an image file. In the two-sided display processing, the first image corresponds to an obverse side, and the second image corresponds to a reverse side. That is, when it is assumed that page images included in the image file are to be two-sided printed, one of two page images having a relationship of obverse and reverse sides during printing is referred to as a "first image", and the other page image is referred to as a "second image".

For example, when a page image of a certain page number, the page image being included in page images of a plurality of pages included in an image file, is referred to as a first image, the page image of the previous or next page number of the page number of the first image can be referred to as a "second image". Also, one of an image printed on the message side of a postcard, which is a print medium, and an image printed on the address side of the postcard can be referred to as a "first image", and the other image can be referred to as a "second image".

The one-sided display processing is processing in which the display control unit 12b causes the display unit 13 to display the first image or the second image. That is, one of the first image and the second image that are to be two-sided printed is displayed on the display unit 13.

Figure 7:
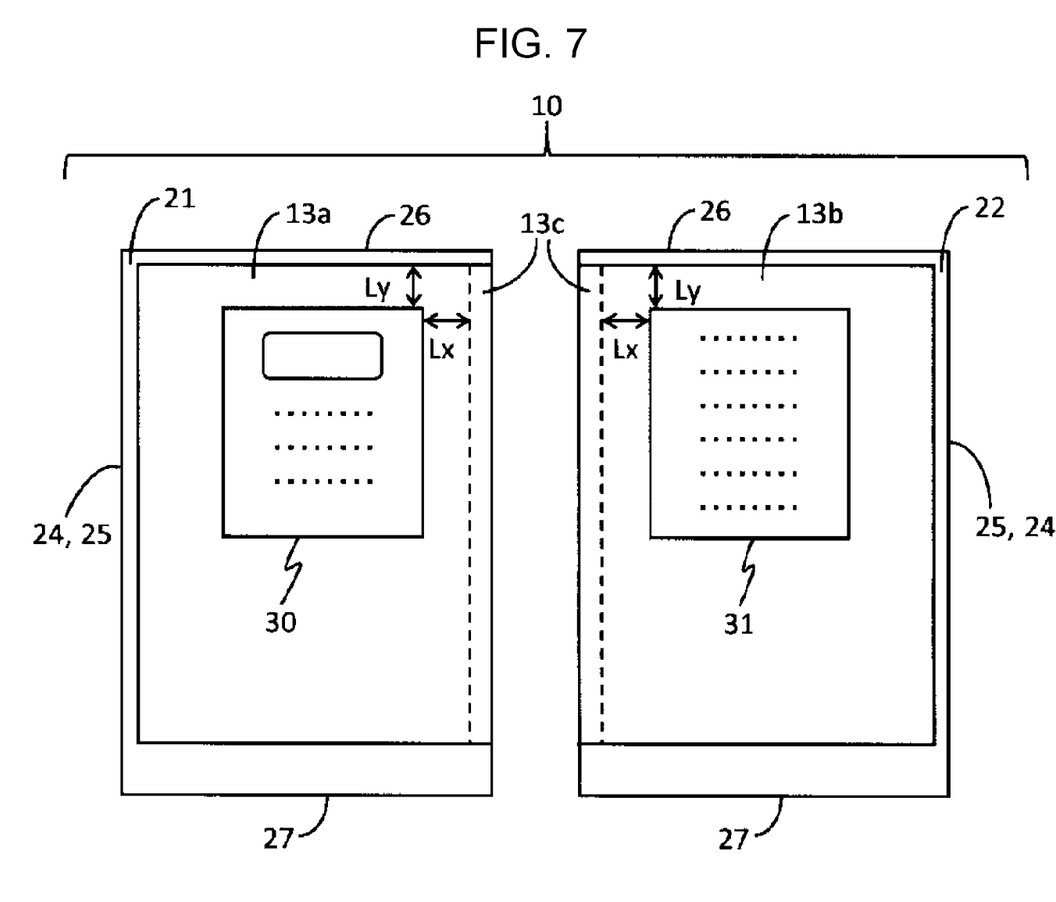
FIG. 7 is a view illustrating a state in which a first image and a second image are displayed in two-sided display processing.

FIG. 7 illustrates a state in which a first image 30 and a second image 31 are displayed in the two-sided display processing in step S130. With respect to the terminal device 10 in the folded form, the first housing 21 viewed from a viewpoint that opposes the first display region 13a is illustrated at the left side in FIG. 7, and the second housing 22 viewed from a viewpoint that opposes the second display region 13b is illustrated at the right side in FIG. 7. In step S130, the display control unit 12b causes the first image 30 to be displayed in the first display region 13a, which is one of the regions other the bending region 13c on the display unit 13, and causes the second image 31 to be displayed in the second display region 13b, which is one of the regions other than the bending region 13c. Although, in examples illustrated in FIGS. 7 to 11, the shape of the terminal device 10 is a symmetric shape as illustrated in FIGS. 2 and 3, the shape of the terminal device 10 may be an asymmetric shape as illustrated in FIGS. 4 and 5.

In step S130, the display control unit 12b causes the first image 30 and the second image 31 to be displayed at mutually overlapping positions in the first display region 13a and the second display region 13b. The "mutually overlapping positions" as used herein refer to positions where the first image 30 and the second image 31 overlap each other when viewed from a viewpoint in a direction orthogonal to the surfaces of the first display region 13a and the second display region 13b on the display unit 13 in the folded form.

In the example illustrated in FIG. 7, a boundary line between the first display region 13a and the bending region 13c is a right side of the first display region 13a, and a boundary line between the second display region 13b and the bending region 13c is a left side of the second display region 13b. In such a case, the display control unit 12b renders the first image 30 in the first display region 13a so that the right side of the first image 30 is located a predetermined distance Lx away from the right side of the first display region 13a, and the upper side of the first image 30 is located a predetermined distance Ly away from the upper side of the first display region 13a. Also, the display control unit 12b renders the second image 31 in the second display region 13b so that the left side of the second image 31 is located the predetermined distance Lx away from the left side of the second display region 13b, and the upper side of the second image 31 is located the predetermined distance Ly away from the upper side of the second display region 13b.

As a result of such processing, the first image 30 and the second image 31 are displayed at mutually overlapping positions in the first display region 13a and the second display region 13b. As a result, when the size of the first image 30 and the size of the second image 31 are the same, the first image 30 and the second image 31 are displayed at positions where they completely overlap each other in the first display region 13a and the second display region 13b. Even when the size of the first image 30 and the size of the second image 31 differ from each other, the first image 30 and the first display region 13a are displayed to have a positional relationship in which they partly overlap each other in the second image 31 and the second display region 13b in step S130. The display control unit 12b may set both the predetermined distance Lx and the predetermined distance Ly to 0. Even when the first display region 13a and the second display region 13b on the display unit 13 are two separate displays, the display control unit 12b causes the first image 30 and the second image 31 to be displayed at mutually overlapping positions in the first display region 13a and the second display region 13b in step S130.

Figure 8:
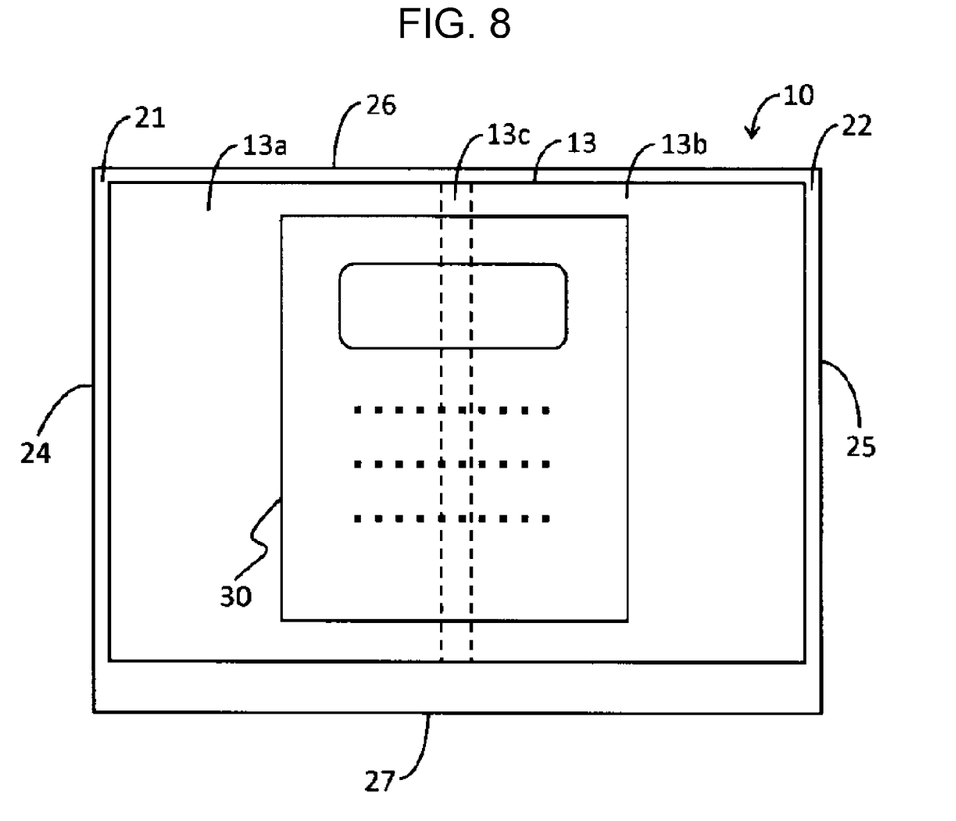
FIG. 8 is a view illustrating a state in which the first image is displayed in one-sided display processing.

FIG. 8 illustrates a state in which the first image 30 is displayed in the one-sided display processing in step S140. FIG. 8 illustrates the terminal device 10 that is in the extended form, viewed from a viewpoint that opposes the display unit 13, as in FIG. 3. In step S140, the display control unit 12b may display an image in one of the first display region 13a and the second display region 13b or may display an image across the first display region 13a and the second display region 13b, as illustrated in FIG. 8. In the example illustrated in FIG. 8, the display control unit 12b causes the first image 30 to be displayed across the first display region 13a, the bending region 13c, and the second display region 13b. Also, in step S140, the display control unit 12b may cause an image to be displayed on the display unit 13 with a larger size than the size of each image in step S130 in which two images are displayed on the display unit 13 at the same time. In the example illustrated in FIG. 8, the first image 30 is displayed with a larger size than the size of the first image 30 illustrated in FIG. 7. In the state illustrated in FIG. 8, upon receiving a page transition instruction for advancing the page from the user, the display control unit 12b causes an image of the next page of the first image 30 to be displayed on the display unit 13 as the second image 31.

According to the flowchart in FIG. 6, when the form of the display unit 13 changes from the folded form to the extended form, the processing performed by the display control unit 12b is switched from the two-sided display processing in step S130 to the one-sided display processing in step S140. Conversely, when the form of the display unit 13 changes from the extended form to the folded form, the processing performed by the display control unit 12b is switched from the one-sided display processing in step S140 to the two-sided display processing in step S130.

3. Brief Summary

As described above, according to the present embodiment, the terminal device 10 includes: a display unit 13 that can take a plurality of forms including a folded form in which the display unit 13 is bent between the first display region 13a and the second display region 13b and an extended form in which the display unit 13 is not bent between the first display region 13a and the second display region 13b; and a display control unit 12b that controls display performed by the display unit 13. When the display unit 13 is in the folded form, the display control unit 12b causes a first image, which corresponds to an obverse side, to be displayed in the first display region 13a and causes a second image, which corresponds to a reverse side, to be displayed in the second display region 13b. The display unit 13 can take forms other than the form of the extended form and the folded form, and one example of the other forms is a form in which the display unit 13 is in form transition between the folded form and the extended form.

According to the above-described configuration, when the display unit 13 is in the folded form, the first image 30 and the second image 31, one of which is an image of a reverse side of the other image during two-sided printing, are displayed in the first display region 13a and the second display region 13b, respectively. This allows the user to check the first image 30 and the second image 31 that appear to be substantially the same as a print result of two-sided printing on a medium, such as paper, thus making it possible to prevent unintended printing. That is, it is possible to perform preview with which the user can more intuitively recognize the result of the two-sided printing.

According to the present embodiment, the display unit 13 is one flexible display that includes the first display region 13a and the second display region 13b and that can be bent between the first display region 13a and the second display region 13b. According to the above-described configuration, by effectively utilizing features of a bendable flexible display, it is possible to allow the user to check the first image 30 and the second image 31 that appear to be substantially the same as the print result of the two-sided printing.

Also, according to the present embodiment, based on the model information of the terminal device 10, the display control unit 12b identifies the bending region 13c where the flexible display is bent in the folded form. When the display unit 13 is in the folded form, the first image 30 and the second image 31 are displayed in the first display region 13a and the second display region 13b, which are regions other than the bending region 13c. According to this configuration, when the display unit 13 is in the folded form, the first image 30 and the second image 31 are displayed in the first display region 13a and the second display region 13b, each of which is not folded and is planar, and thus the user can comfortably view the first image 30 and the second image 31.

Also, according to the present embodiment, when the display unit 13 is in the folded form, the display control unit 12b causes the first image 30 and the second image 31 to be displayed at mutually overlapping positions in the first display region 13a and the second display region 13b. According to this configuration, the user can view, via the display unit 13 that is in the folded form, the first image 30 and the second image 31 that are in a state very close to a result of actual printing of the first image 30 and the second image 31 on a print medium.

Also, according to the present embodiment, when the display unit 13 is in the extended form, the display control unit 12b causes the first image 30 or the second image 31 to be displayed on the display unit 13. According to the above-described configuration, by switching the form of the display unit 13 to the extended form, the user can cause the first image 30 or the second image 31 to be singularly displayed on the display unit 13 and can check the displayed image 30 or 31 in detail. Also, by appropriately switching the form of the display unit 13 between the folded form and the extended form, the user can switch between the two-sided display processing in step S130 and the one-sided display processing in step S140.

In addition, according to the present embodiment, a non-transitory computer-readable storage medium storing the display control program 12 that controls image display performed by the display unit 13 is disclosed. The display unit 13 can take a plurality of forms including the folded form and the extended form, and when the display unit 13 is in the folded form, the display control program 12 causes the first image 30 to be displayed in the first display region 13a and causes the second image 31 to be displayed in the second display region 13b. The processing performed by the display control program 12 can be regarded as a display control method for controlling image display performed by the display unit 13.

4. Modification

Next, a description will be given of some modifications included in the present embodiment. Differences from those in the embodiments described above and other modifications will be described in each modification. As can be understood from the above description, in a period in which the determination "Yes" in step S120 and the determination "No" in step S150 are repeated, the display control unit 12b executes the two-sided display processing in step S130. Processing during such two-sided display processing is performed in each of first to third modifications described below.

First Modification

Before causing the terminal device 10 to execute preview display of an image file prior to printing, the user appropriately performs printing setting by operating the display unit 13, which is a touch panel. The control unit 11 stores the printing setting performed by the user. The printing setting is information reported to a printer in conjunction with an image-file print instruction to the printer, and in the present embodiment, the user performs two-sided printing setting. In a state in which the two-sided printing setting is received, when the second image 31 displayed in the second display region 13b on the display unit 13 in the folded form is rotated in accordance with an external operation, the display control unit 12b may change the two-sided printing setting in accordance with a result of the rotation.

Figure 9:
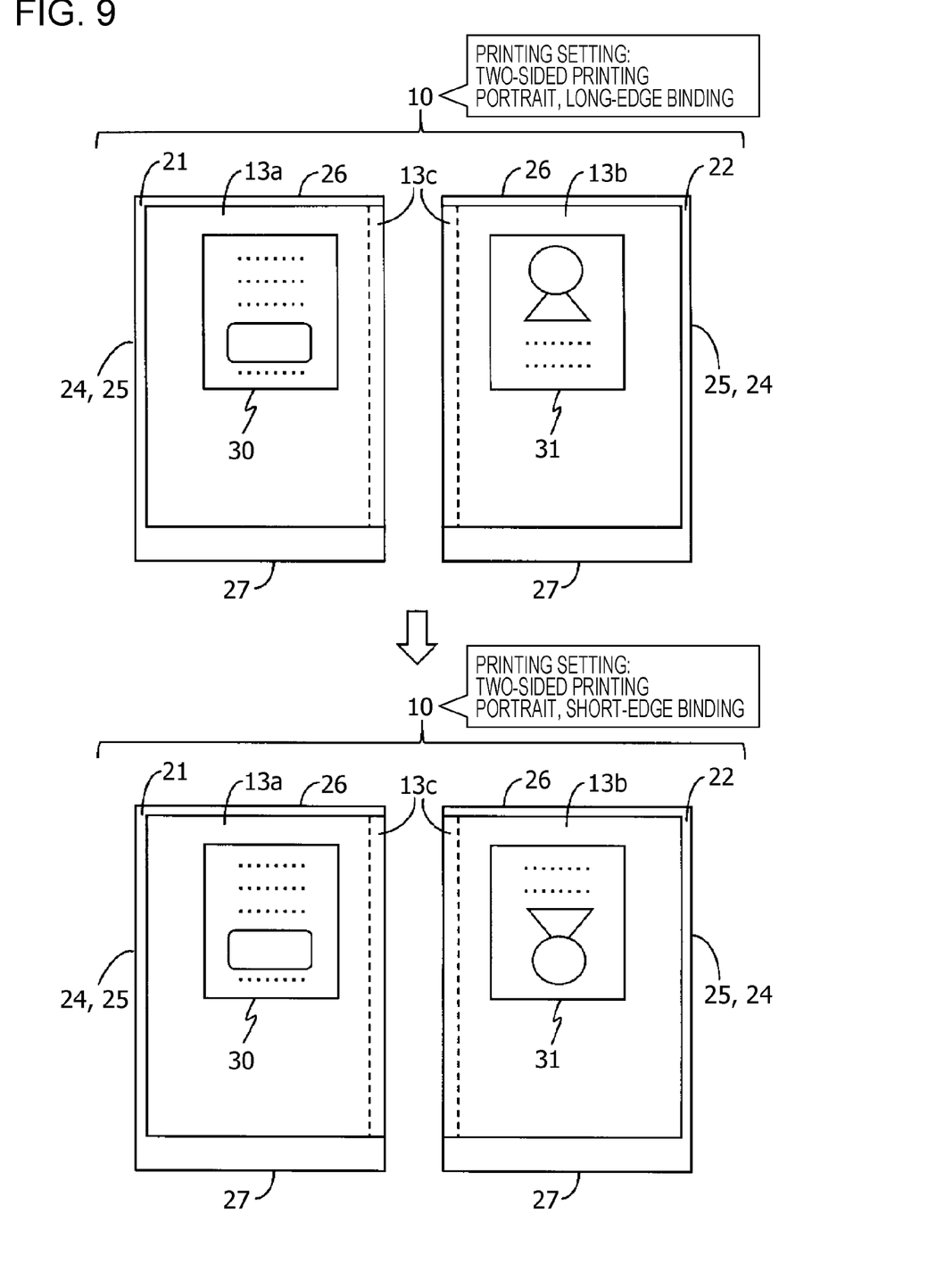
FIG. 9 is a view illustrating a first modification.

FIG. 9 is a view illustrating a first modification. With respect to the terminal device 10 in the folded form, the first housing 21 viewed from the viewpoint that opposes the first display region 13a is illustrated at the left side in FIG. 9, and the second housing 22 viewed from the viewpoint that opposes the second display region 13b is illustrated at the right side in FIG. 9, as in FIG. 7. Also, the terminal devices 10 having different printing settings are respectively illustrated at the upper side and the lower side in FIG. 9 to thereby illustrate a state in which the second image 31 displayed in the second display region 13b is turned upside down. In this case, it is assumed that two-sided printing setting has been performed by the user as one item of the printing setting. More specifically, as illustrated at the upper side in FIG. 9, a setting "portrait orientation and long-edge binding" has been performed as the two-sided printing setting.

During execution of the two-sided display processing, when a predetermined operation for turning the second image 31, displayed in the second display region 13b, upside down is received from the user, the display control unit 12b causes the second image 31 to be rotated 180° in the second display region 13b in accordance with the received operation, as illustrated at the lower side in FIG. 9. When the second image 31 is rotated in this manner, the up-and-down orientation of the first image 30 and the up-and-down orientation of the second image 31 become opposite to each other, so that the two-sided printing setting supports short-edge binding for portrait orientation. Accordingly, the display control unit 12b changes the current two-sided printing setting "portrait orientation and long-edge binding" to a two-sided printing setting "portrait orientation and short-edge binding" and stores the changed printing setting.

When the control unit 11 ends the processing in the flowchart in FIG. 6 and receives an image-file print instruction from the user, the control unit 11 sends an image file on which desired editing, such as image rotation, has been performed and the printing setting stored at this point in time to the printer via the wireless communication unit 16 to cause the printer to execute image-file printing based on the printing setting. According to such a first modification, when the user rotates the second image 31 displayed in the second display region 13b on the display unit 13 in the folded form, the display control unit 12b changes the two-sided printing setting in accordance with a result of the rotation. This makes it possible to eliminate or reduce additional effort for changing the two-sided printing setting to be performed by the user.

Second Modification

In a state in which the display unit 13 is in the folded form, and a page image of page number N is displayed in the first display region 13a as the first image 30, and a page image of page number N+1 is displayed in the second display region 13b as the second image 31, when the terminal device 10 is turned upside down, the display control unit 12b may cause the page image of page number N to be displayed in the first display region 13a as the first image 30 and cause a page image of page number N−1 to be displayed in the second display region 13b as the second image 31. Each page number is a natural number. For example, for an image file including page images for a total of ten pages, the page number is a natural number of 1 to 10.

Figure 10:
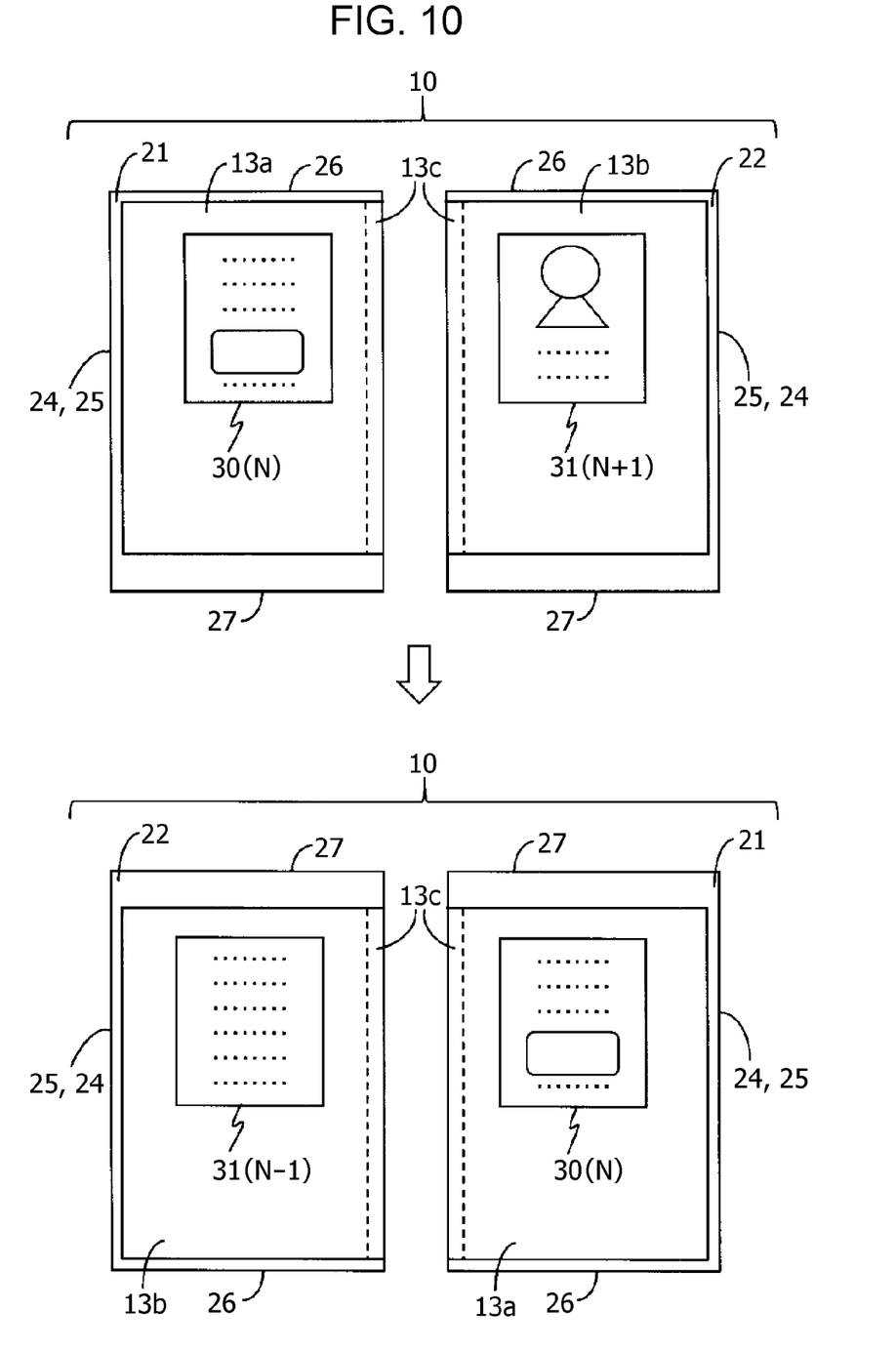
FIG. 10 is a view illustrating a second modification.

FIG. 10 is a view illustrating a second modification. At the upper side in FIG. 10, with respect to the terminal device 10 in the folded form, the first housing 21 viewed from the viewpoint that opposes the first display region 13a is illustrated at the left side, and the second housing 22 viewed from the viewpoint that opposes the second display region 13b is illustrated at the right side in FIG. 10, as in FIGS. 7 and 9. In the terminal device at the upper side in FIG. 10, the third end portion 26 is directed upward. The terminal device 10 after the up-and-down orientation of the terminal device 10 illustrated at the upper side in FIG. 10 is reversed is illustrated at the lower side in FIG. 10. Thus, at the lower side in FIG. 10, with respect to the terminal device 10 in the folded form, the second housing 22 viewed from the viewpoint that opposes the second display region 13b is illustrated at the left side, and the first housing 21 viewed from the viewpoint that opposes the first display region 13a is illustrated at right side. In the terminal device 10 at the lower side in FIG. 10, the third end portion 26 is directed downward.

As is known, even when the user changes the orientation of the terminal device 10, the terminal device 10 automatically maintains the up-and-down orientation of an image that is being displayed. In the example illustrated in FIG. 10, when the user turns the terminal device 10 upside down, the display control unit 12b recognizes that the terminal device 10 is turned upside down, based on an output from the first sensor 14. Then, the display control unit 12b turns each of the first image 30 and the second image 31 upside down, so that the up-and-down orientation of each of the first image 30 and the second image 31 matches the current up-and-down orientation of the terminal device 10.

When the terminal device 10 in the folded form is turned upside down, the display control unit 12b switches the display content of the second image 31 in the second display region 13b from a page image of page number N+1 to a page image of page number N−1, as can be seen from comparison between the terminal device 10 at the upper side in FIG. 10 and the terminal device 10 at the lower side in FIG. 10. In FIG. 10, reference numerals 30 and 31 are followed by the image page numbers in parentheses. Also, when the user turns the terminal device 10 in the state, illustrated at the lower side in FIG. 10, upside down, the display control unit 12b switches the display content of the second image 31 in the second display region 13b from the page image of page number N−1 to the page image of page number N+1. According to such a second modification, by rotating the terminal device 10 so that the terminal device 10 in the folded form becomes upside down, the user can check a page image whose page number is smaller than of a previously displayed page image and can check a page image whose page number is larger than that of a previously displayed page image via the second display region 13b on the display unit 13.

Third Modification

In a state in which the first image 30 and the second image 31 are displayed in the first display region 13a and the second display region 13b on the display unit 13 in the folded form, when an operation for page transition is externally received, the display control unit 12b may cause transition of images displayed on the display unit 13, in the transition two images being transitioned for each page transition.

Figure 11:
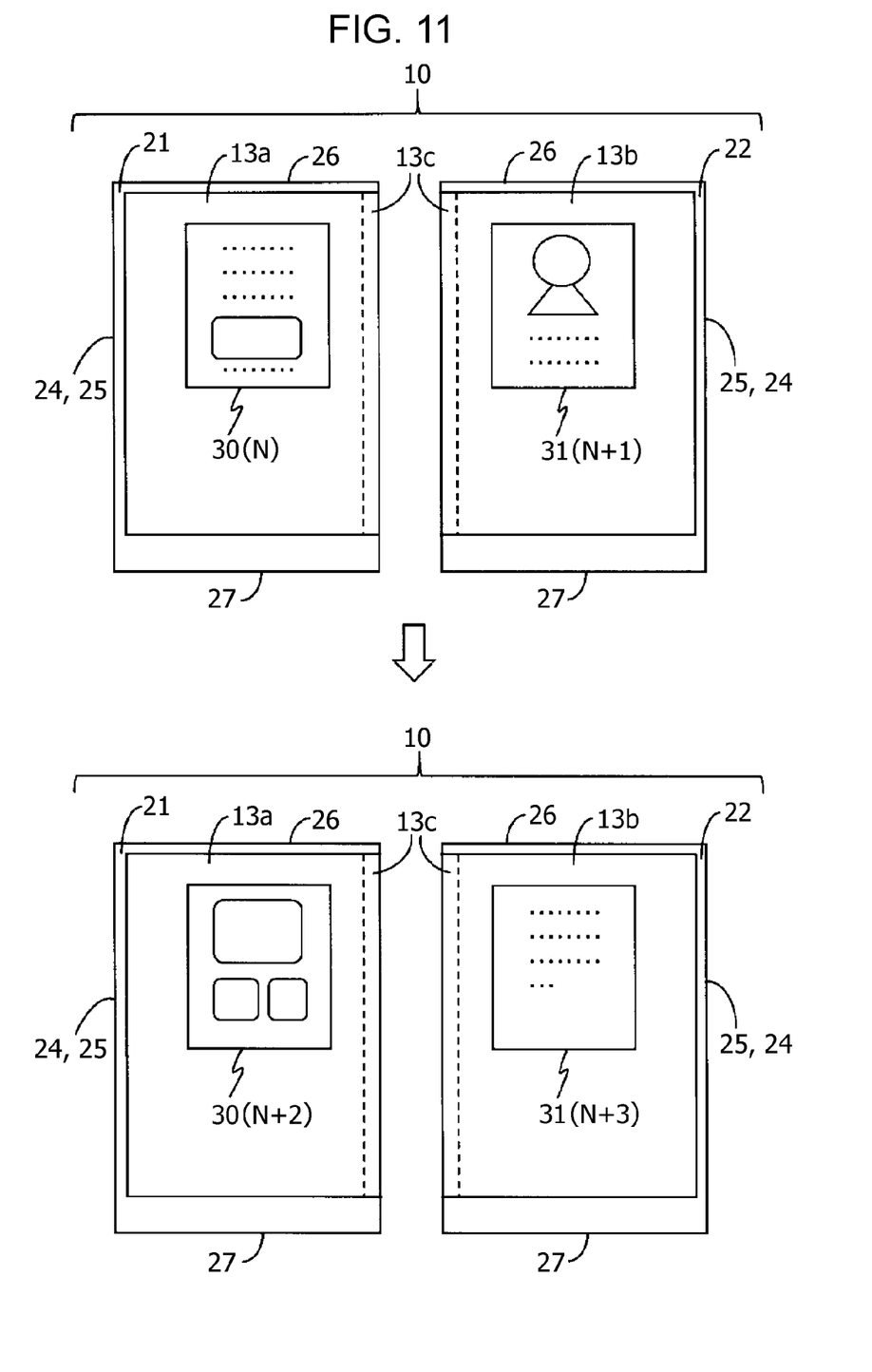
FIG. 11 is a view illustrating a third modification.

FIG. 11 is a view illustrating a third modification. With respect to the terminal device 10 in the folded form, the first housing 21 viewed from the viewpoint that opposes the first display region 13a is illustrated at the left side in FIG. 11, and the second housing 22 viewed from the viewpoint that opposes the second display region 13b is illustrated at the right side in FIG. 11, as in FIGS. 7 and 9. Also, the terminal devices 10 having different printing settings are respectively illustrated at the upper side and the lower side in FIG. 11 to thereby illustrate a state of transition of an image displayed in the first display region 13a and an image displayed in the second display region 13b. In FIG. 11, reference numerals 30 and 31 are followed by page numbers of images, as in FIG. 10.

The user can give a page transition instruction by operating a "forward" button or a "back" button for a page displayed on the display unit 13 or sliding a finger or the like in contact with the display unit 13, that is, swiping the display unit 13 with a finger or the like. According to the example in FIG. 11, upon receiving a page transition instruction, the display control unit 12b switches the display content of the first image 30 in the first display region 13a from a page image of page number N to a page image of page number N+2 and switches the display content of the second image 31 in the second display region 13b from a page image of page number N+1 to a page image of page number N+3, as can be seen from comparison between the terminal device 10 at the upper side and the terminal device 10 at the lower side. This is processing when the display control unit 12b receives a page transition instruction for advancing the page. Upon receiving a page transition instruction for returning to a previous page, the display control unit 12b switches the display content of the first image 30 in the first display region 13a from the page image of page number N to a page image of page number N−2 and switches the display content of the second image 31 in the second display region 13b from the page image of page number N+1 to a page image of page number N−1.

According to such a third modification, each time the user gives a page transition instruction to the terminal device 10 in the folded form, two images are transitioned on the display unit 13 at a time. Thus, the user can comfortably browse images of a plurality of pages.

Other Descriptions

The display control processing according to the present embodiment can naturally be applied to processing other than preview display of images prior to printing. That is, the terminal device 10 according to the present embodiment may be applied to a scene in which images not intended for printing are processed and a scene in which images are merely browsed. One possible example of such scenes is a scene in which a scanner generates scan data by reading both sides of an original that was two-sided printed, the terminal device 10 obtains the scan data, and images of two pages included in the scan data are displayed in the first display region 13a and the second display region 13b on the display unit 13 in the folded form.

What is claimed is:

1. A terminal device comprising:
   a display unit configured to take a plurality of forms including a folded form in which the display unit is bent between a first display region and a second display region and an extended form in which the display unit is not bent between the first display region and the second display region; and
   a display control unit that controls display performed by the display unit, wherein
   the display control unit causes the display unit to display a preview of a print job for printing a plurality of images, when the display unit is in the extended form, one of the plurality of images is displayed on the display unit, and when the display unit is in the folded form, a first image in the plurality of images is displayed in the first display region, and a second image in the plurality of images that corresponds to a reverse side of the first image is displayed in the second display region.

2. The terminal device according to claim 1, wherein the display unit is one flexible display that includes the first display region and the second display region and that is configured to be bent between the first display region and the second display region.

3. The terminal device according to claim 2, wherein the display control unit identifies a bending region where the flexible display is bent in the folded form, based on model information of the terminal device, and when the display unit is in the folded form, the display control unit causes the first image and the second image to be displayed in the first display region and the second display region that are regions other than the bending region.

4. The terminal device according to claim 1, wherein when the display unit is in the folded form, the display control unit causes the first image and the second image to be displayed at mutually overlapping positions in the first display region and the second display region.

5. The terminal device according to claim 1, wherein when the display unit is in the extended form, the display control unit causes the first image or the second image to be displayed on the display unit.

6. The terminal device according to claim 1, wherein in a state in which two-sided printing setting for printing the first image on a first side of a print medium and printing the second image on a second side corresponding to a reverse side of the first side of the print medium is received, when the second image displayed in the second display region on the display unit in the folded form is rotated in accordance with an external operation, the display control unit changes the two-sided printing setting in accordance with a result of the rotation.

7. A terminal device comprising, a display unit configured to take a plurality of forms including a folded form in which the display unit is bent between a first display region and a second display region and an extended form in which the display unit is not bent between the first display region and the second display region; and a display control unit that controls display performed by the display unit, wherein:

the display control unit causes a first image corresponding to an obverse side to be displayed in the first display region and causes a second image corresponding to a reverse side to be displayed in the second display region, when the display unit is in the folded form, and in a state in which the display unit is in the extended form and the display control unit causes a page image of page number N to be displayed in the first display region as the first image and causes a page image of page number N+1 to be displayed in the second display region as the second image, when the terminal device is turned upside down, the display control unit causes the page image of page number N to be displayed in the first display region as the first image and causes a page image of page number N−1 to be displayed in the second display region as the second image.

8. The terminal device according to claim 1, wherein

In a state in which the display control unit causes the first image and the second image to be displayed in the first display region and the second display region on the display unit in the folded form, when an operation for page transition is externally received, the display control unit causes transition of images displayed on the display unit, in the transition two images being transitioned as a unit of page transition.

9. A non-transitory computer-readable storage medium storing a display control program for controlling image display performed by a display unit configured to take a plurality of forms including a folded form in which the display unit is bent between a first display region and a second display region and an extended form in which the display unit is not bent between the first display region and the second display region, the display control program comprising:

causing the display unit to display a preview of a print job for printing a plurality of images, wherein:

when the display unit is in the extended form, one of the plurality of images is displayed on the display unit, and when the display unit is in the folded form, a first image in the plurality of images is displayed in the first display region, and a second image in the plurality of images that corresponds to a reverse side of the first image is displayed in the second display region.

10. A display control method for controlling image display performed by a display unit configured to take a plurality of forms including a folded form in which the display unit is bent between a first display region and a second display region and an extended form in which the display unit is not bent between the first display region and the second display region, the display control method comprising:

causing the display unit to display a preview of a print job for printing a plurality of images, wherein:

when the display unit is in the extended form, one of the plurality of images is displayed on the display unit, and when the display unit is in the folded form, a first image in the plurality of images is displayed in the first display region, and a second image in the plurality of images that corresponds to a reverse side of the first image is displayed in the second display region.

* * * * *